United States Patent
Alzner et al.

(10) Patent No.: US 10,201,765 B2
(45) Date of Patent: Feb. 12, 2019

(54) COLUMN WITH ANGULAR PROFILES

(71) Applicant: LINDE AKTIENGESELLSCHAFT, Munich (DE)

(72) Inventors: Gerhard Alzner, München (DE); Christian Matten, Pullach (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 300 days.

(21) Appl. No.: 14/913,692

(22) PCT Filed: Aug. 5, 2014

(86) PCT No.: PCT/EP2014/002147
§ 371 (c)(1),
(2) Date: Feb. 23, 2016

(87) PCT Pub. No.: WO2015/043698
PCT Pub. Date: Apr. 2, 2015

(65) Prior Publication Data
US 2016/0206970 A1      Jul. 21, 2016

(30) Foreign Application Priority Data

Sep. 25, 2013 (EP) .................................. 13004650

(51) Int. Cl.
*B01D 3/00* (2006.01)
*C10G 7/00* (2006.01)
(Continued)

(52) U.S. Cl.
CPC ............. *B01D 3/008* (2013.01); *B01D 3/324* (2013.01); *B01D 53/185* (2013.01); *B01J 4/001* (2013.01);
(Continued)

(58) Field of Classification Search
CPC ...... B01D 3/008; B01D 53/185; B01D 3/324; C10G 7/06; C10G 7/00; B01J 4/001;
(Continued)

(56) References Cited

U.S. PATENT DOCUMENTS

| | | | |
|---|---|---|---|
| 2,470,652 A | 5/1949 | Scofield | |
| 4,476,069 A | 10/1984 | Harper et al. | |

(Continued)

FOREIGN PATENT DOCUMENTS

| | | |
|---|---|---|
| DE | 10051523 A1 | 5/2001 |
| DE | 102006014334 A1 | 10/2007 |

(Continued)

*Primary Examiner* — Randy Boyer
*Assistant Examiner* — Juan C Valencia
(74) *Attorney, Agent, or Firm* — Millen White Zelano & Branigan, PC

(57) ABSTRACT

The invention relates to a column having: a shell, which is extended along a longitudinal axis and encloses an interior of the column, at least one mass transfer tray, which is extended along a column cross section, extending transversely to the longitudinal axis, of the column, and at least one liquid distributor, which is designed to feed the at least one mass transfer tray with a liquid phase. In accordance with the invention, the mass transfer tray has a plurality of runoff elements extending parallel to and at a distance from one another, more particularly in the form of angular profiles, which are each extended along the column cross section, where the runoff elements each have first and second runoff surfaces extended along the column cross section, and where the two runoff surfaces converge along the longitudinal axis in the direction of the liquid distributor and meet, and in so doing form an edge extended along the column cross section, and where the liquid distributor is designed to apply the liquid phase to the edges of the runoff elements, so that the liquid phase applied to the respective (Continued)

runoff element flows off from the respective runoff element via the runoff surfaces at both sides of the respective edge.

18 Claims, 12 Drawing Sheets

(51) Int. Cl.
    *B01D 3/32*     (2006.01)
    *B01J 19/32*     (2006.01)
    *B01D 53/18*     (2006.01)
    *B01J 4/00*     (2006.01)
    *C10G 7/06*     (2006.01)

(52) U.S. Cl.
    CPC .............. *B01J 19/32* (2013.01); *C10G 7/00* (2013.01); *C10G 7/06* (2013.01); *B01J 2219/00247* (2013.01); *B01J 2219/3221* (2013.01); *B01J 2219/32213* (2013.01); *B01J 2219/32231* (2013.01); *B01J 2219/3325* (2013.01)

(58) Field of Classification Search
    CPC .............. B01J 19/32; B01J 2219/32231; B01J 2219/32213; B01J 2219/3221; B01J 2219/3325; B01J 2219/00247
    See application file for complete search history.

(56) References Cited

U.S. PATENT DOCUMENTS

| | | |
|---|---|---|
| 6,891,061 B1 | 5/2005 | Nishimura et al. |
| 2014/0245887 A1* | 9/2014 | Pellegrin ................ B01D 53/18 |
| | | 95/150 |

FOREIGN PATENT DOCUMENTS

| | | |
|---|---|---|
| EP | 0367525 A1 | 5/1990 |
| FR | 2086365 A1 | 12/1971 |

* cited by examiner

COLUMN WITH ANGULAR PROFILES

The invention relates to a column, more particularly for mass transfer and/or energy transfer between a liquid phase and a gaseous phase that is passed in countercurrent to said liquid phase.

Columns of this kind have a shell, which is extended along a longitudinal axis and which encloses an interior of the column, and have at least one mass transfer tray, which is extended in the interior of the column over a column cross section that extends transversely to the longitudinal axis. Such a column also has at least one liquid distributor, which is designed to feed the at least one mass transfer tray with a liquid phase, in order to allow mass transfer and/or energy transfer with a gaseous phase which is passed in countercurrent through the at least one mass transfer tray.

Columns of the abovementioned kind are used, for example, as oil scrub columns (referred to as primary fractionators), as water quench columns (referred to as quench water towers), and also as columns for atmospheric distillation and vacuum distillation in the processing of crude oil. Because of the resultant condensates with relatively long-chain hydrocarbons, such columns suffer from severe fouling, with detrimental consequences for the mass transfer trays and/or elements that are used.

The greatest fouling problem in said oil scrub columns is that of the individual mass transfer trays by formation of polymer. This polymer formation is based essentially on two mechanisms.

Firstly the condensing components comprise monomers (these are, for example, unsaturated hydrocarbons such as naphthenes, indenes or styrenes). These monomers can form polymers under certain conditions. These conditions might include a temperature range amenable to polymerization, the presence of the monomers at sufficiently high concentration, long residence times on the internals, and the presence of rust. These influences are referred to as "fouling factors". All four conditions should ideally be prevented from occurring.

Secondly the major part of the liquid hydrocarbons, which are introduced to the petroleum spirit section as the first scrubbing medium, evaporate via the petroleum spirit section on the way downwards. As a result, the smallest quantity of liquid and hence the longest residence time of the liquid is on the mass transfer trays or elements at the lower end of the petroleum spirit section. With increasing reflux, moreover, there is an increase in evaporation of the longer-chain hydrocarbons and hence in the temperature of the gaseous top product.

On this basis, therefore, the problem addressed by the present invention is that of designing a column of the aforementioned kind to be less susceptible to fouling, without detractions—more particularly, without any substantial detractions—from the transfer activity and the capacity.

This problem is solved by a column having the features described below.

Provision is made accordingly for the mass transfer tray to have a plurality of runoff elements extending parallel to and at a distance from one another, more particularly in the form of angular profiles, which are each extended along said column cross section, where the runoff elements each have first and second runoff surfaces (more particularly planar surfaces) which are extended along the column cross section, where the two runoff surfaces converge along the longitudinal axis of the column shell, in the direction of the liquid distributor, in an angular manner, and meet and in so doing form an edge which is extended along said column cross section, where the liquid distributor is designed to apply the liquid phase to the edges of the mass transfer elements in a defined manner, so that the liquid phase applied to the respective runoff element flows off from the respective runoff element via the runoff surfaces at both sides of the edge. The edges of the runoff elements may also be of rounded design. The runoff elements preferably have an accentuated edge.

In addition, the liquid distributor, in accordance with the invention, has a multiplicity of cutouts via which the liquid phase can be applied to the edges of the runoff elements, the cutouts each being arranged perpendicularly above an edge of an assigned runoff element. In addition, the liquid distributor has a plurality of final distributor channels which are each extended along said column cross section and also transversely to the runoff elements. In addition, the final distributor channels each have a base, which is extended along the column cross section and two side walls starting from said base, said side walls each having an upper rim, and the cutouts in the form of vacancies, more particularly rectangular vacancies, being formed at the two upper rims.

In the case of runoff elements in the form of angular profiles (especially those with equal arms), the runoff elements have two arms, which converge angularly, more particularly at right angles, along the longitudinal axis in the direction of the liquid distributor, and meet, and in so doing form an edge which is extended along the column cross section. The runoff surfaces of the respective runoff element or angular profile are then formed by the upwardly turned top faces (i.e., those facing the liquid distributor) of the arms.

The arms or runoff surfaces preferably include an angle in the range from 80° to 100°, more particularly an angle of 90°. The width of the runoff surfaces perpendicular to their direction of longitudinal extent is preferably 40 mm to 150 mm, preferably 100 mm.

Said longitudinal axis of the column or of the column shell is extended preferably—based on a column properly arranged and ready for operation—along the vertical. The shell of the column is of cylindrical design at least in sections, with the longitudinal axis of the column coinciding in this case with the cylinder axis of the shell.

The mass transfer tray of the invention advantageously enables the generation of a multiplicity of curtains of the liquid phase, namely by the liquid phases flowing off from the runoff surfaces, and also, possibly and additionally, the generation of a two-phase layer on the runoff surfaces, which contributes to an improved efficiency. In this respect it has emerged in tests that the mass transfer trays of the invention, also referred to as cascade trays, are comparable with dual-flow trays. These are sieve trays without a downcomer but with relatively large passage openings, more particularly with a diameter in the range from 20 mm to 40 mm, where the gas phase and the liquid phase flow in countercurrent through the passage openings.

Tests have additionally shown that said cascade trays are superior in terms of capacity and efficiency to the single-flow side-to-side baffles. Side-to-side baffles are single-flow or multi-flow, inclined or horizontal column trays, which in particular are of through construction, thus having no passage openings, and which are extended merely over a part of the column cross section, with column trays arranged one above another being offset from one another such that the phase flowing off from one column tray arrives on the column tray arranged beneath it. For example, such column trays may be arranged alternately on opposite sides of the column, so that the liquid phase flows back and forth on its way downwards in the column.

By virtue of their construction, the mass transfer trays of the invention are, advantageously, unsusceptible to fouling, in the absence, for example, of any small-area openings that might rapidly become clogged. The efficiency is relatively high—according to tests, around twice as high as that of single-flow or dual-flow side-to-side baffles. Moreover, their capacity exceeds that of the side-to-side baffles. Because of the angular runoff elements, the mass transfer trays of the invention also have a comparatively high structural strength, although underslung supports are preferably used (see below).

The runoff elements or their runoff surfaces (or said arms) are preferably of longitudinally extended design, meaning that along their direction of longitudinal extent they have a greater length than they do transverse to this direction, and are extended preferably over the entire column cross section, i.e. from one inside region of the shell to an opposite inside region of the shell of the column. These runoff elements may be composed of a plurality of segments, each per se being designed as a runoff element and being arranged one after another along the direction of longitudinal extent. A gap present between two such segments (and interrupting the runoff surfaces of the composite runoff element) may be concealed by a capping element, which bears against the two runoff-surface segments of the respective segment, giving the overall impression of a uniform runoff element, which is extended in particular essentially along the entire column cross section from one inside region of the shell of the column to an opposite inside region of the shell of the column.

The mass transfer tray is extended preferably over the entire column cross section, with the runoff elements extending parallel to one another being preferably arranged equidistantly from one another transversely to their direction of longitudinal extent, meaning that pairs of adjacent runoff elements define an elongated passage opening or hole in the mass transfer tray, through which a gaseous phase is able to ascend in the column along the longitudinal axis of the column shell.

With further preference the mass transfer tray has a carrier ring via which the mass transfer tray is fixed in place, in particular on the shell, with the carrier ring preferably running around an inside of the shell of the column along said column cross section. The runoff elements in this case lie preferably on the carrier ring in each case by a first end region and by an opposite, second end region. In this arrangement, one of the end regions is mounted on the carrier ring via a fixed bearing, the other end region via a sliding bearing. Where one runoff element consists of a plurality of segments, there is preferably one fixed bearing per segment; the other bearings of the segment in question are preferably sliding bearings.

Furthermore, the mass transfer elements may be supported by one, two or more bearers (more particularly profiled bearers) which extend parallel to one another and are extended along said column cross section, these bearers extending transversely to the runoff elements and being members on which the runoff elements and/or their components (see above) lie. With their opposite end regions, such bearers preferably each engage beneath the carrier ring, and are each joined on one side, via a sliding bearing arranged beneath the carrier ring, to the shell, and on the other side via a fixed bearing arranged beneath the carrier ring.

The column preferably has a plurality of such mass transfer trays, which are arranged one above another along the longitudinal axis of the column shell, with the mass transfer trays preferably extending parallel to one another.

The runoff elements of two adjacent mass transfer trays are preferably arranged with an offset relative to one another, so that liquid phase which flows off from one runoff surface of an upper runoff element impinges on a runoff surface of a lower runoff element which is arranged beneath it with an offset.

As already explained, the at least one liquid distributor more preferably has a multiplicity of cutouts via which the liquid phase can be applied to the edges of the runoff elements and/or angular profiles. The cutouts for this purpose are preferably each arranged perpendicularly along the longitudinal axis of the column shell above an edge of an assigned runoff element or angular profile.

This advantageously ensures that the full quantity of liquid is already available at the uppermost mass transfer tray, in contrast to spray nozzles, where regularly 30% to 50% of the liquid ends up in the gaps or passage openings between the runoff elements and becomes effective only on lower mass transfer trays. Preferably, therefore, the liquid distributor is designed to apply the liquid phase entirely onto the runoff elements, more particularly their edges. Furthermore, the liquid effluent via the top of the respective column is disadvantageously greater when liquid is sprayed (small droplets).

As already explained, the at least one liquid distributor more preferably has a plurality of longitudinally extended final distributor channels, which are each extended along said column cross section and also transversely to the runoff elements or to their respective direction of longitudinal extent, over substantially the entire column cross section.

Said final distributor channels preferably each have a base, which is extended along the column cross section, and two side walls, starting from said base, being longitudinally extended, and lying opposite one another, said side walls each having an upper rim, and the cutouts in the form of vacancies, more particularly rectangular vacancies, being formed at the two upper rims. At the end faces, furthermore, the final distributor channels are preferably bounded by a further side wall. Said vacancies or cutouts on the rims of the side walls more particularly each have a lower edge, over which the liquid phase flows from the respective final distributor channel onto the underlying edge of a runoff element, where this lower edge, along the longitudinal axis of the column, is at a distance from the respective base of the final distributor channel in question, so that in theory the respective final distributor channel is able to collect fouling down to said lower edges of the cutouts, where the respective final distributor channel is then always still able to pass the liquid phase for distribution, in a defined manner, via the cutouts or vacancies and onto the assigned mass transfer tray.

Furthermore, the liquid distributor preferably has at least two longitudinally extended preliminary distributor channels, arranged parallel to one another and above the final distributor channels along the longitudinal axis of the column shell, the preliminary distributor channels being intended for feeding the final distributor channels with the liquid phase, where the preliminary distributor channels are extended in particular along said column cross section. The preliminary distributor channels preferably extend perpendicularly to the final distributor channels. The preliminary distributor channels may be connected to one another in flow terms via at least one compensation channel thereby making it possible to compensate any difference in level of the liquid phase in the preliminary distributor channels by way of the at least one compensation channel.

Furthermore, the preliminary distributor channels as well preferably each have a base which is extended along the column cross section, and two side walls which start from said base, are longitudinally extended and are opposite one another, and where said side walls each have an upper rim, where cutouts in the form of vacancies, more particularly rectangular vacancies, are formed at these rims, the liquid phase being able to be passed into respectively one assigned final distributor channel via said cutouts. These cutouts in the preliminary distributor channels are preferably each arranged perpendicularly above an assigned final distributor channel. Here as well, said vacancies or cutouts at the rims each have a lower edge, via which the liquid phase passes from the respective preliminary distributor channel into an underlying final distributor channel, where this lower edge is at a distance, along the longitudinal axis of the column shell, from the respective base of the preliminary distributor channel in question, so that again the respective preliminary distributor channel is able to collect fouling up to said lower edges of its cutouts, while being nevertheless able to apply the liquid phase that is to be distributed, via the cutouts or vacancies, onto the respectively assigned final distributor channel. Furthermore, the preliminary distributor channels are each bounded at their end faces by a further side wall.

Said preliminary distributor channels are preferably charged via at least one feed pipe each, preferably via two feed pipes each, with the liquid phase, where these feed pipes are extended at least in sections along the longitudinal axis of the shell of the column, and so a cutout in the respective feed pipe, via which the liquid phase is delivered from the respective feed pipe, faces the respective base of the preliminary distributor channel to be supplied, along the longitudinal axis. In the region of their respective cutout, said feed pipes are preferably arranged each between two splash plates extending parallel to one another, each of such plates being fixed in place on an assigned side wall of the preliminary distributor channel. Moreover, at the outwardly facing outsides of their side walls, on both sides of the cutouts in the respective preliminary distributor channel, the preliminary distributor channels have one baffle each, the baffles preferably projecting vertically from the respective side wall and each projecting by a lower free end region into the final distributor channel arranged below the respective cutout. The baffles are designed to guide the flow of the liquid phase from the cutouts in the preliminary distributor channels in such a way that said flow ends up as completely as possible in the assigned final distributor channel.

In the embodiment described above, therefore, the preliminary distributor and final distributor channels are preferably designed as upwardly open channels (downwardly, the channels are bounded by said bases, at the sides by said side walls, and by further side walls at the end faces). Said channels are consequently also referred to as preliminary distributor and final distributor grooves, respectively.

In accordance with a further embodiment, the final distributor channels are of tubular design. These final distributor channels each preferably have a peripheral wall, and said cutouts of the final distributor channels are formed as passage openings in these walls. Preferably in each case a plurality of cutouts are arranged alongside one another along a peripheral direction of the respective wall. These passage openings arranged alongside one another therefore feed the same edge of a runoff element which is extended beneath the respective final distributor channel and transversely to it.

Provision is further made for the final distributor channels to start from a tubular preliminary distributor channel which extends transversely to the final distributor channels along said column cross section. The tubular preliminary distributor channel preferably has a peripheral wall, and in particular the final distributor channels start from a lower region of this peripheral wall. These final distributor channels are extended preferably on either side of the preliminary distributor channel, and, in particular, pairs of final distributor channels start in opposite directions from the preliminary distributor channel and are flush with one another, and, in particular, the final distributor channels are each connected partably, more particularly via a flange connection, to the preliminary distributor channel.

Moreover, provision is preferably made for the preliminary distributor channel, for the purpose of feeding the preliminary distributor channel with the liquid phase, to be connected to an inflow pipe which is extended along the column cross section transversely to the preliminary distributor channel, where in particular the preliminary distributor channel starts from an end section of the inflow pipe. The inflow pipe preferably likewise has a peripheral wall, and preferably the preliminary distributor channel starts from a lower region of the peripheral wall on said end section of the inflow pipe.

The above-described liquid distributor with tubular final and preliminary distributor channels is used preferably for aqueous liquid phases, in the case, for example, of columns in the form of water quench columns, which are used, for example, in gas crackers with gaseous feedstocks (e.g. ethane) for cooling and/or cleaning the cracking gas (cf. below).

The liquid distributor described at the outset, with cutouts formed on the rims of side walls, and having, in particular, upwardly open final and preliminary distributor channels or grooves, in contrast, is used preferably for distributing liquid hydrocarbon phases (e.g. pyrolysis oil) in oil scrub columns (or else in atmospheric and vacuum distillation columns) which in the case of liquid crackers with relatively heavy, liquid feedstocks (e.g. naphtha) serve for cooling and cleaning (e.g. splitting of a heavy fraction of hydrocarbons) of the cracking gas produced (cf. below).

In accordance with one further embodiment of the invention, provision is made for the column to have at least one first (e.g. upper) and one second (e.g. lower) process section or circuit, the second section, in comparison to the first section, being more susceptible to fouling than the first section—in other words, the quantity of substances that lead to fouling of column internals (e.g. mass transfer trays, liquid distributors) arising per unit time in the second section is more than in the first section. For this purpose, the column is preferably designed to remove, in the second section, a higher-boiling component (e.g. higher, unsaturated hydrocarbons such as monomers, for example) from a gaseous phase (e.g. cracking gas from a naphtha cracker), the column preferably being designed to remove, in the first section, in comparison thereto, lower-boiling hydrocarbons from said gaseous phase. In the context of the treatment of cracking gas in an oil scrub column, for example, in the first or upper section, scrubbing may take place with a liquid phase in the form of a liquid, hydrocarbon-containing scrubbing medium (e.g. a pyrolysis petroleum spirit), while in the second or lower section, scrubbing takes place with a liquid phase or liquid scrubbing medium which comprises primarily heavier hydrocarbons (e.g. pyrolysis oil or a mixture of pyrolysis petroleum spirit and pyrolysis oil). The petroleum spirit fraction in the upper section boils, at the typically prevailing pressure in the range from 1 bar to 2.5 bar, preferably 1.5 bar, at approximately in the range from 140° C. to 210° C., whereas the liquid oil fraction arising in the lower section boils at temperatures above 250° C. In the first section, then, the lighter condensates are obtained, examples being oily aromatic components consisting of hydrocarbons having, for example, 10 or else fewer carbon atoms (e.g. naphthalenes $C_{10}H_8$). The boiling range in the first section is set preferably to the range from 105° C. to 140° C. In the second section, hydrocarbons having for example more than 10 carbon atoms are primarily condensed out. These are primarily light oils and heavy oils. The end of boiling of the petroleum, spirit is situated for example at about 100° C., that of the light oil at about 128° C., for example, and that of the heavy oil at about 171° C., for example. The objective here in particular is to set the temperature levels such that heat consumers can be supplied with the liquids. The general rule for an oil scrub column is that the fraction of the longer-chain molecules increases from top to bottom. Particulate solids such as soots and tars have separated out from the gas phase primarily in the lower section, and are present in the liquid phase. The viscosity of the liquid phase likewise increases from top to bottom in the column. With advantage, therefore, the oil scrub column has the less fouling-susceptible runoff elements of the invention, or mass transfer trays equipped with these elements, in the lower or second section. In the upper section there are fewer polymers or longer-chain hydrocarbons. Here, therefore, mass transfer elements or a mass transfer device with a higher effectiveness than the runoff elements of the second section can be used. A mass transfer device of this kind is preferably a sieve tray, a valve tray, a mesh packing, a structured packing, or a dumped packing bed.

Where the column is designed as an oil scrub column, being set up and intended to cool a cracking gas and also to remove a hydrocarbon fraction (more particularly a heavy hydrocarbon fraction) from the cracking gas, said liquid distributor is preferably designed to apply a scrubbing medium in the form of a liquid hydrocarbon phase (e.g. pyrolysis oil) to these runoff elements or angular profiles of the invention, in order to subject the cracking gas, which is passed in countercurrent, to this scrubbing medium. In this case the final and preliminary distributor channels are preferably designed as upwardly open channels (see above).

In accordance with a further exemplary embodiment of the invention, the column is designed as a water quench column, which subjects a cracking gas—produced, for example, by cracking of a gaseous feedstock, such as ethane, for example—to a liquid phase which comprises water or is formed by water, in order to cool and to clean the cracking gas. In this case, in particular, the liquid distributor is designed to apply this water-comprising or water liquid phase to the runoff elements or angular profiles, in order to subject the cracking gas, which is passed in countercurrent, to this liquid phase. In the case of a column in the form of a water quench column, the liquid distributor preferably has the above-described tubular final and preliminary distributor channels.

According to a further embodiment, the column is designed for the atmospheric distillation of a crude oil stream (i.e., the rectification takes place under atmospheric pressures). In this case, preferably heated crude oil is fractionated by rectification in the column into a plurality of constituents or condensates. This crude oil preferably enters the column as two phases (gas/liquid). The highest temperature is in the bottoms of the column, and so here the light constituents are unable to condense and rise further upwards in gas form. At the top of the column, for example, gas and light petroleum spirit, referred to as naphtha, are obtained, including kerosene, diesel fuel and light heating oil. Gas-oil (starting materials for heating oil and for diesel), for example, further below, and the atmospheric residue in the bottoms.

The column in this case is preferably subdivided into a plurality of sections, in which the respective condensate or respective constituent is obtained. The individual sections may be separated from one another by chimney trays, allowing the gaseous phase to ascend in the column from section to section, and the respective condensates to be taken off.

In each case at least one, preferably two or more, of the mass transfer trays of the invention is or are arranged preferably in the lowermost section or in a plurality of lower sections, in which the heaviest condensates are produced, possibly also in the sections thereabove; the mass transfer trays of one section are fed preferably by a liquid distributor of the invention (see above) with a liquid phase, more particularly with the respective condensate of the section in question (or, where appropriate, of a column section situated thereabove), in countercurrent to the gaseous phase. The possibility also exists of equipping conventional columns for atmospheric distillation with the mass transfer frays of the invention, having runoff elements, and with the corresponding liquid distributors of the invention.

In accordance with a further embodiment, the column is designed as a column for the vacuum distillation of a crude oil stream or of a bottoms product of the atmospheric distillation. In this case, as described above in relation to the atmospheric distillation or rectification, condensates can be separated off from said bottoms product in different sections, though now there is a vacuum prevailing in the column or in its individual sections. The column pressure in this case may lie within a range from 10 mbar to 30 mbar.

Further details and advantages of the invention are to be elucidated through the following figure descriptions of exemplary embodiments by means of the figures.

Figure 1:
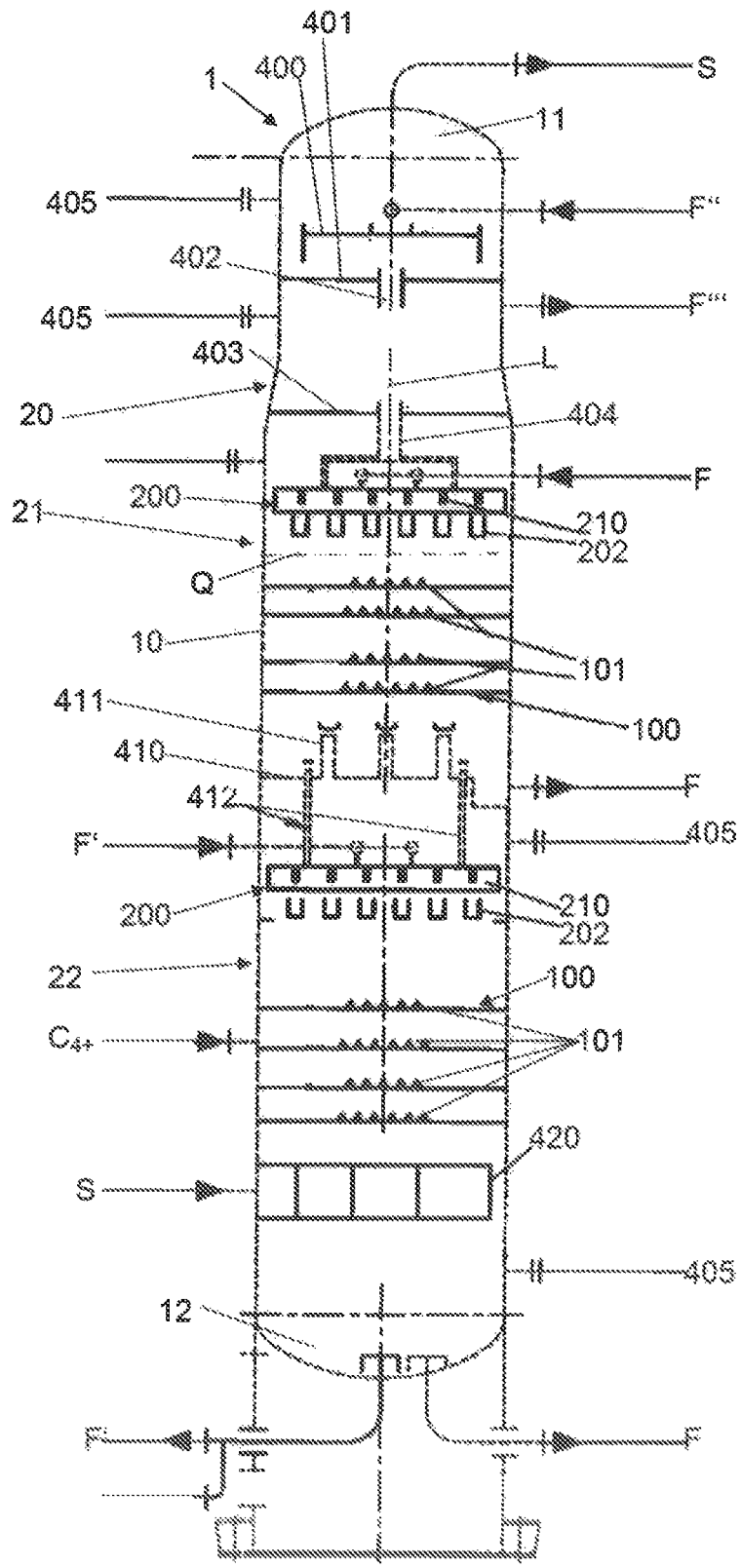
FIG. 1 shows a sectional view of an oil scrub column with inventive mass transfer trays.
Figure 2:
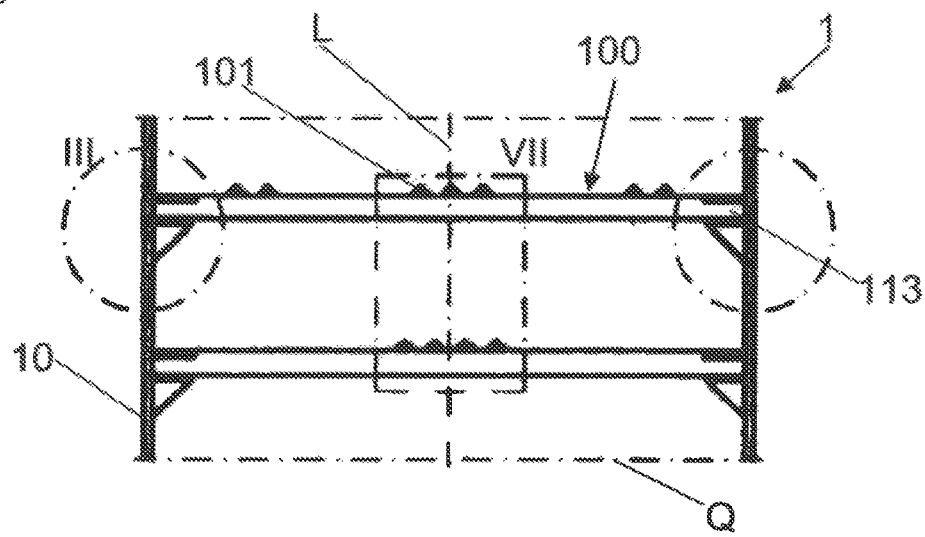
FIG. 2 shows a detail from FIG. 1.
Figure 3:
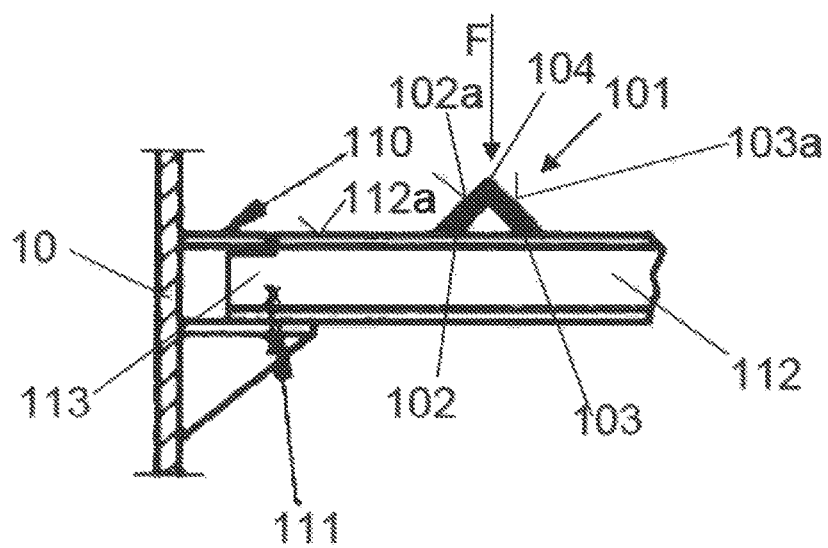
FIG. 3 shows the detail III as per FIG. 2.
Figure 4:
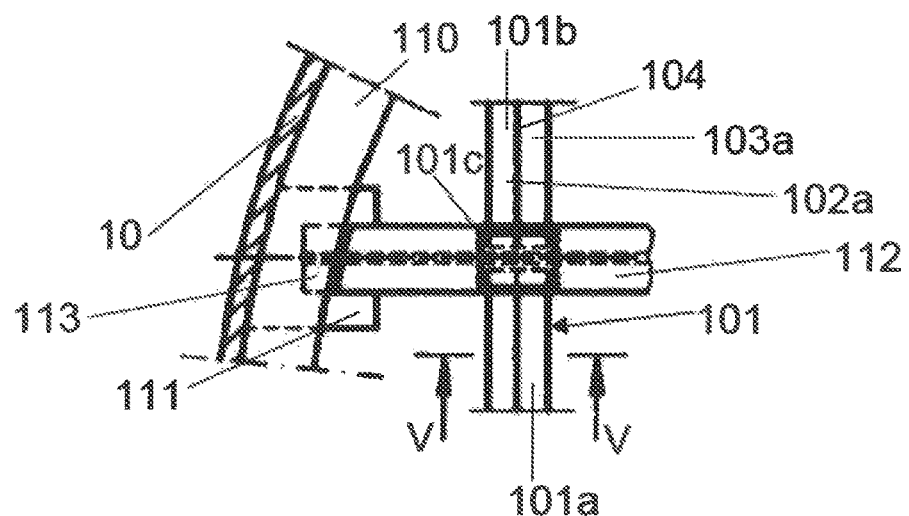
FIG. 4 shows a plan view of the detail as per FIG. 3.
Figure 5:
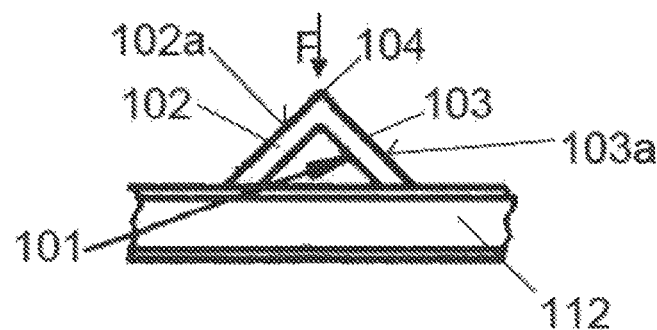
FIG. 5 shows a partially sectioned view along the line V-V in FIG. 4.
Figure 6:
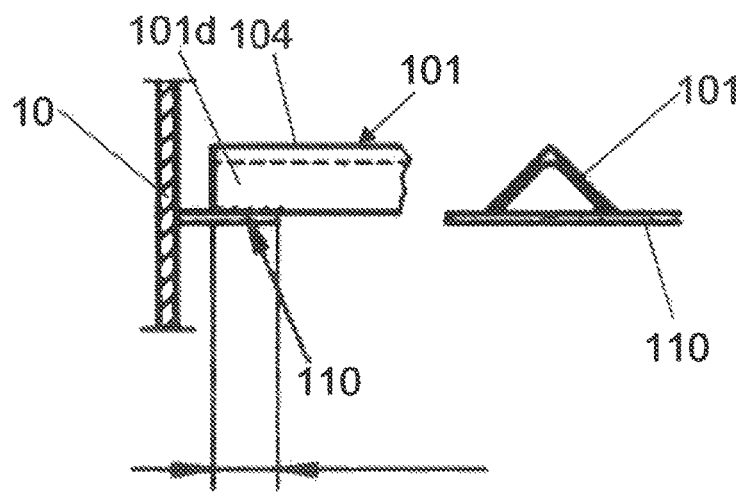
FIG. 6 shows a detail view of a fixed bearing of an inventive runoff element.
Figure 14:
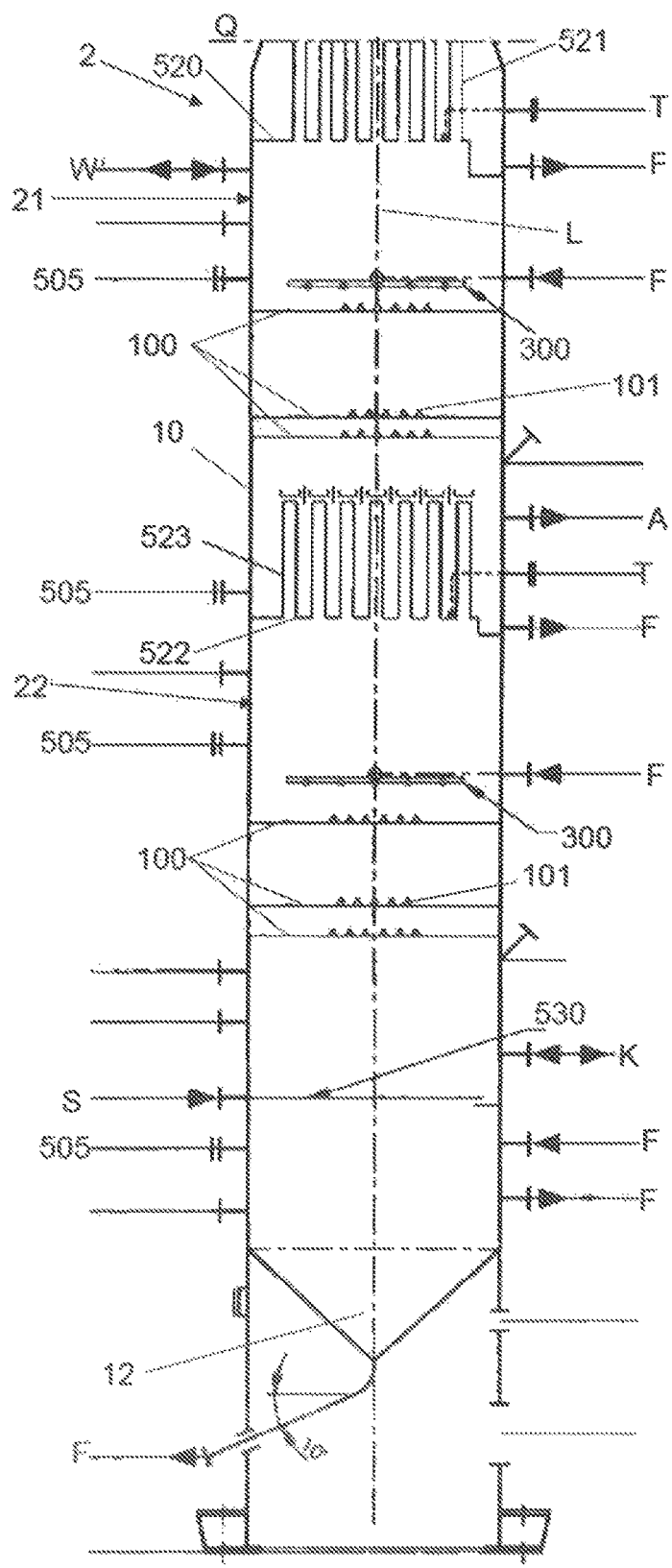
FIGS. 14-15 show a sectional view of a column in the form of a water quench column with inventive mass transfer trays.
Figure 15:
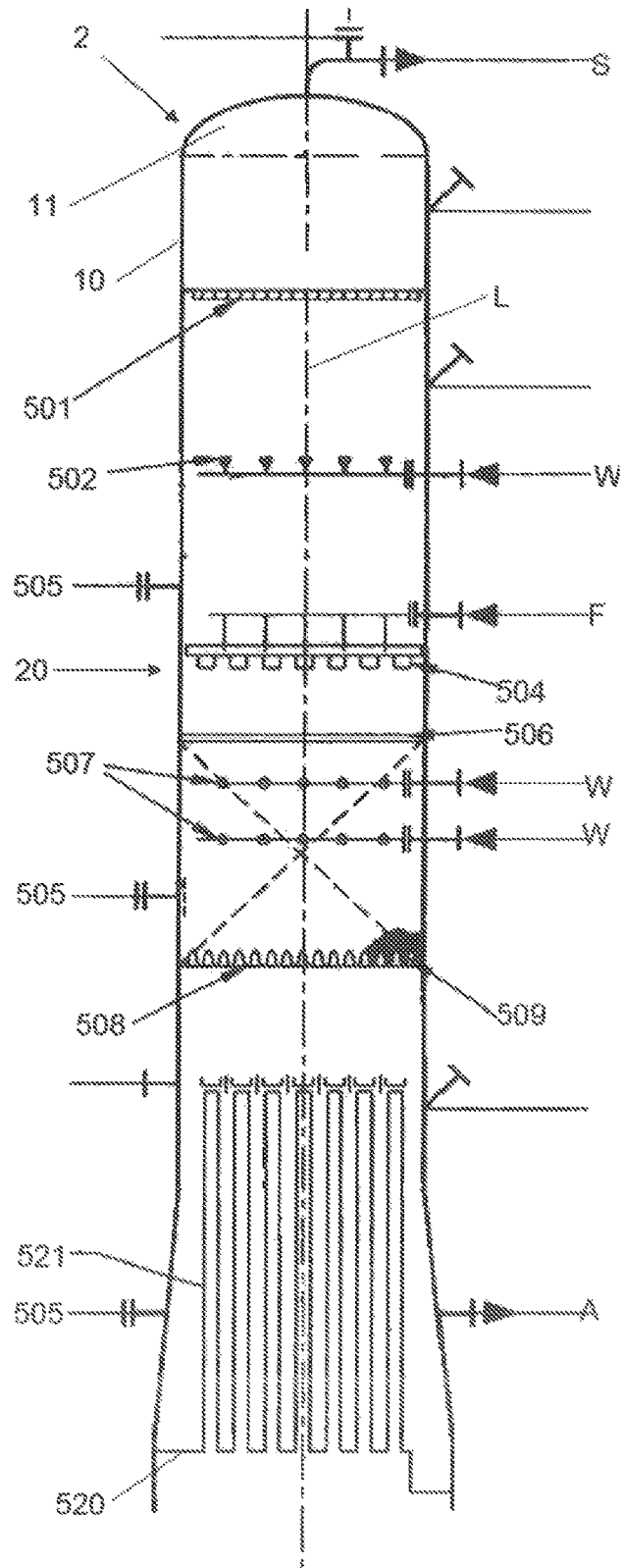
Figure 22:
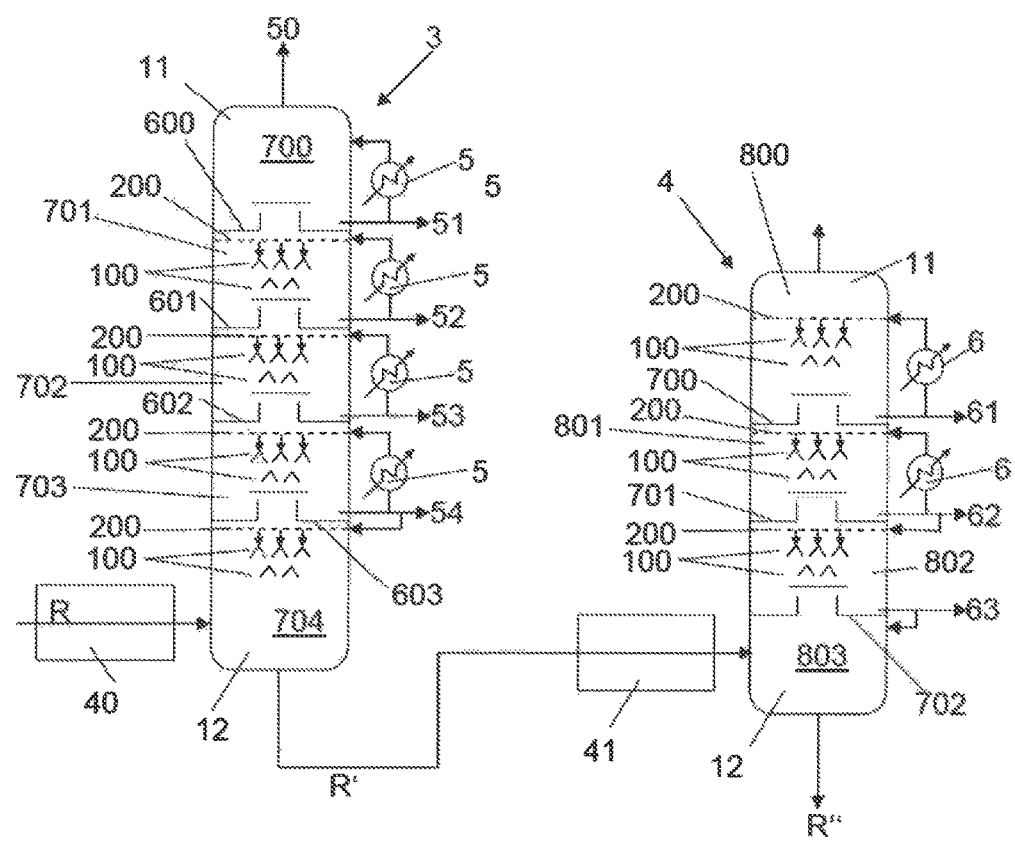
FIG. 22 shows a schematic sectional view of a column for atmospheric distillation and a column for vacuum distillation of a crude oil stream.

FIGS. 2 to 8 show an inventive mass transfer tray 100, which may be employed, for example, in art oil scrub column 1 as per FIG. 1 for the cooling and cleaning of a cracking gas S, in a water quench column 2 as per FIGS. 14 and 15 for the cooling and scrubbing of a cracking gas S, in a column 3 for atmospheric distillation or in a column 4 for vacuum distillation of a crude oil stream R as per FIG. 22. Generally speaking, the inventive mass transfer tray 100 can be employed advantageously anywhere in columns where there is a high fouling risk because of the gaseous and/or liquid phases between which mass transfer is intended.

Said columns 1-4 have a peripheral shell 10 which is extended along a longitudinal axis L and which encloses an interior of the respective column 1-4, the respective mass transfer tray 100 being extended within this interior substantially over the entire column cross section Q, which is oriented perpendicularly to the longitudinal axis L.

Figure 8:
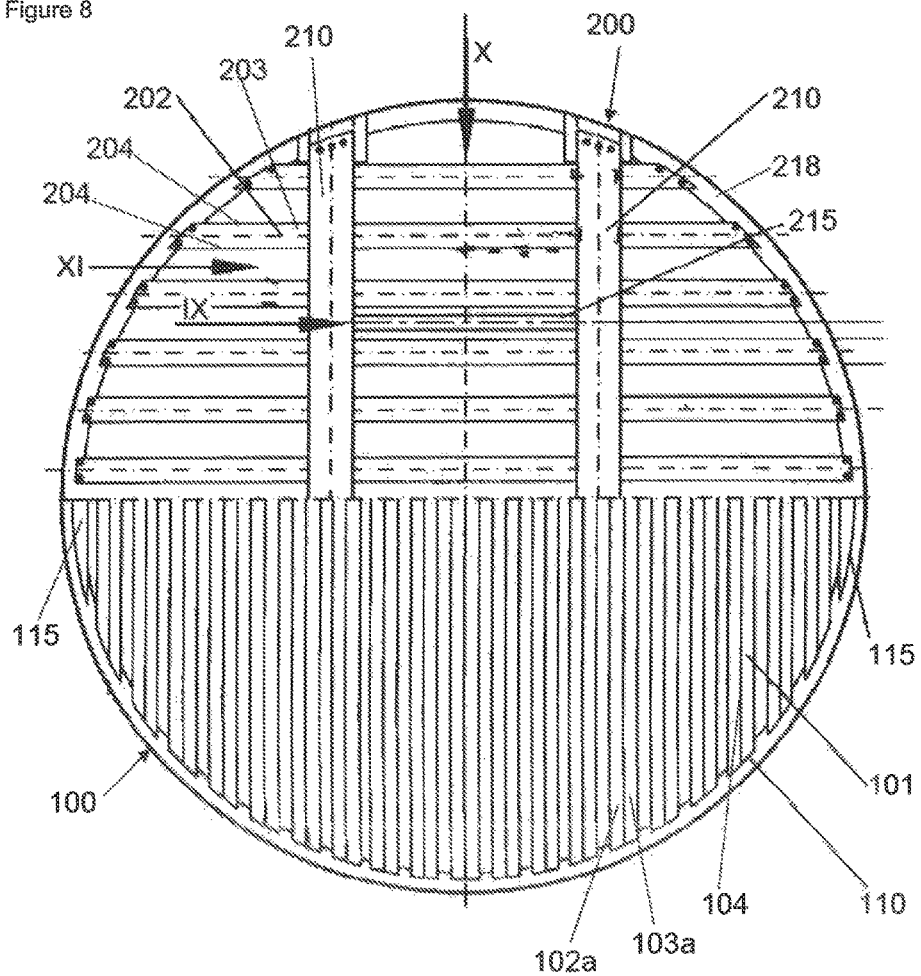
FIG. 8 shows a plan view of an inventive mass transfer tray (lower part) and of a liquid distributor (upper part) for applying a liquid phase to the mass transfer tray.

According to FIG. 8, the mass transfer tray 100 has a plurality of longitudinally extended runoff elements 101, which are oriented parallel to one another and are extended parallel to said column cross section Q, at the same height (relative to the longitudinal axis L of the shell 10). Adjacent runoff elements 101 here are spaced apart from one another equidistantly and transversely to their direction of longitudinal extent, thus forming a passage opening or hole between each pair of runoff elements 101, through which a gaseous phase is able to ascend in the interior of the column 1-4.

In accordance with FIGS. 3 to 5, 6 and 8, the runoff elements 101 each have first and second arms 102, 103, which are joined angularly to one another to form an edge 104, so that the runoff elements 101 form equal-armed angular profiles 101. The respective edges 104 of the runoff elements 101 are likewise of longitudinally extended design, and extend parallel to the column cross section Q. Moreover, the arms 102, 103 of the runoff elements 101 converge upwardly along the longitudinal axis L, meaning that the two arms 102, 103 of a runoff element 101 define an upwardly facing runoff surface 102a, 103a, each of which drops downwards, starting from the edge 104 of the respective runoff element 101. If, correspondingly, a liquid phase F is applied by a liquid distributor to the respective edge 104 of a runoff element 101, it flows off downwards via the runoff surfaces 102a, 103a at both sides of the respective edge 104, thereby forming two curtains of the liquid phase F.

Figure 7:
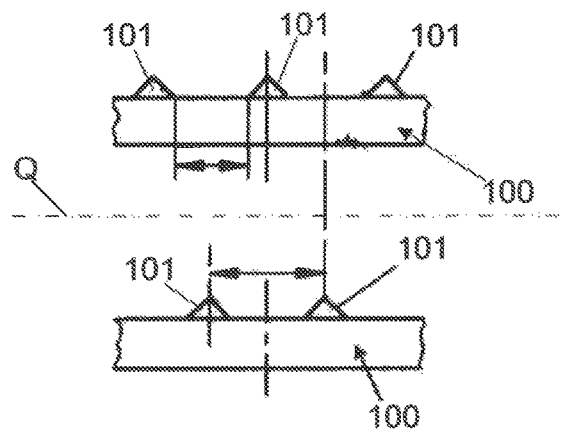
FIG. 7 shows a sectional detail view of the detail VII as per FIG. 2.

In accordance with FIG. 7, preferably a plurality of inventive mass transfer trays 100 are arranged one above another along the longitudinal axis L, the runoff elements 101 of adjacent mass transfer trays 100 being arranged with an offset relative to one another along the column cross section Q, and so the liquid phase F running off from the runoff surfaces 102a, 103a of the respective runoff element 101 of a mass transfer tray 100 is applied to two runoff elements 101, arranged below this runoff element 101, of an underlying mass transfer fray 100. Here, the runoff elements 101 of the respectively lower mass transfer tray 100 are arranged along the column cross section Q, preferably in each case centrally between two runoff elements 101 of the mass transfer tray 100 situated above it. The inventive mass transfer trays 100 are therefore also called cascade trays.

In accordance with FIGS. 3-6, the runoff elements 101 of a mass transfer tray 100 lie, with mutually opposite end regions 101d (cf. FIG. 6), on an assigned, peripheral carrier ring 110, which is fixed in place on an inside of the shell 10 of the respective column 1-4. Here, one end region 101d is mounted via a fixed bearing, the other via a sliding bearing, on the carrier ring 110.

The runoff elements 101 may be extended continuously over the column cross section Q from one inside region of the shell 10 of the column to an opposite inside region of the shell 10 of the column. Also possible, however, is for a runoff element 101 to consist of a plurality of segments 101a, 101b (cf. FIG. 4), which are arranged one after another along the direction of longitudinal extent of the runoff element 101. In this case, gaps between two adjacent segments 101a, 101b may be covered over by a cap 101c. In that case, such segments 101a, 101b lie by their free end regions on the carrier ring 110 and/or on a bearer 112, more particularly a profiled bearer 112, which is extended transversely to the runoff elements 101. Optionally it is possible to provide a plurality of such bearers 112, which in that case extend parallel to one another. One end region of a segment 101a, 101b is then mounted via a fixed bearing on the carrier ring 110 or on a bearer 112, the other end region, respectively, via a sliding bearing.

The bearers 112, where present, engage by one free end region 113 each beneath the carrier ring 110, said region 113 lying on a bearing 111 fixed in place beneath the respective carrier ring 110 on the inside of the shell 101. These end regions 113 of the respective bearer 112 have a vacancy to accommodate the assigned carrier ring 110, and so the respective carrier ring 110, together with the respective bearer 112, forms a substantially stepless surface 112a, on which the runoff elements 101 may lie (cf. FIG. 3). In the case of the bearers 112, in each case, likewise preferably, one end region 113 is mounted via a bearing 111 in the form of a sliding bearing 111 (cf. FIG. 3) on the shell 10, whereas the other end region 113 is mounted via a fixed bearing (cf. FIG. 2).

Furthermore, in accordance with FIG. 8, the mass transfer tray 100 may in each case have, to the side of an outermost runoff element 101, a cover element 115, whose purpose is to delimit the passage opening between said runoff element 101 and the cover element 115 to the envisaged width.

In order to feed a plurality of mass transfer trays 100, arranged one above another, with a liquid phase F, a first embodiment of a liquid distributor 200 is provided in accordance with FIGS. 8-13. This distributor 200 has a plurality of upwardly open final distributor channels 202, which are box-shaped in cross section, arranged along the longitudinal axis L of the respective column 1-4 above the mass transfer trays 100 and which are extended in each case along said column cross section Q and also transversely to the runoff elements 101.

The longitudinally extended final distributor channels 202 each have a base 203, which is extended parallel to the column cross section Q, and also two side walls 204, said side walls 204 starting from said base 203 and having an upper rim 205 (cf. FIG. 10), along which cutouts 201 in the form of rectangular vacancies are formed, these vacancies being arranged along the longitudinal axis L of the respective column 1, 3, 4 in each case perpendicularly above an edge 104 of a runoff element 101 which is assigned to the respective cutout 201. To distribute the liquid phase F onto the runoff elements 101, the final distributor channels 202 are then charged with the liquid phase P in such a way that this phase F passes over the lower edges 206, extending parallel to the respective base 203, of the individual cutouts 201, and falls down onto said edges 104, and is distributed further downwards by the cascaded runoff elements 101 (cf. FIG. 7), thus forming a multiplicity of curtains of the liquid phase F, in which a gaseous phase for treatment (e.g. cracking gas) S is forced in countercurrent, thereby occasioning an intense mass transfer and/or energy transfer between the phases F and S.

Figure 9:
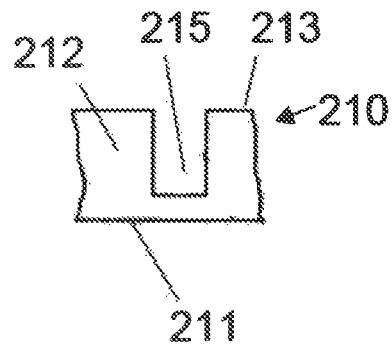
FIG. 9 shows a detail view along the direction IX of FIG. 8 of a compensation channel of the liquid distributor, which joins two preliminary distributor channels of the liquid distributor to one another.
Figure 10:
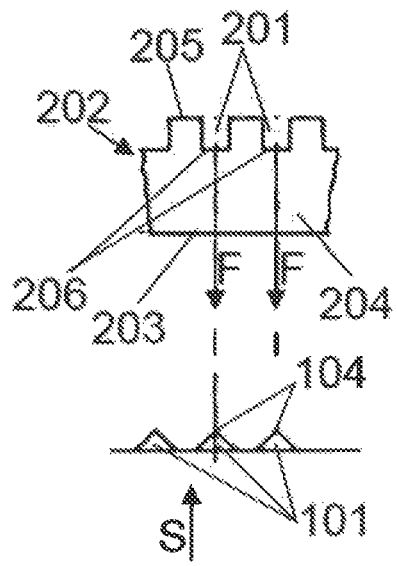
FIG. 10 shows a detail view along the direction X of FIG. 8 of a final distributor channel with cutouts in the form of rectangular vacancies, which are designed along one rim of a side wall of the final distributor channel.
Figure 11:
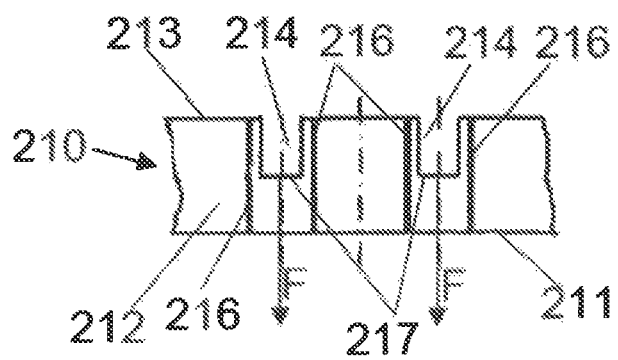
FIG. 11 shows a detail view along the direction XI of FIG. 8 of a preliminary distributor channel with cutouts in the form of rectangular vacancies, which are designed along one rim of a side wall of the preliminary distributor channel.

For the purpose of charging the final distributor channels 202 with the liquid phase F, in accordance with FIG. 9, two preliminary distributor channels 210 are provided, which are parallel to one another and are arranged above the final distributor channels 202 along the longitudinal axis L, said channels 210 likewise being designed to be upwardly open and being box-shaped in cross section. The preliminary distributor channels 210 are likewise extended along the column cross section Q, preferably, in the same way as for the final distributor channels 202, over substantially the entire column cross section, i.e., from one inside region of the shell 10 of the respective column 1, 3, 4 to an opposite inside region of the shell 10. Furthermore, the preliminary distributor channels 210 are extended transversely to the final distributor channels 202.

The preliminary distributor channels 210 likewise each have a base 211, which is extended parallel to the column cross section Q, and also two side walls 212, which start from said base 211 and which each have an upper rim 213, on which cutouts 214 in the form of rectangular vacancies are designed, via which the liquid phase F can be passed into one assigned final distributor channel 202 in each case. For this purpose, the cutouts 214 of the preliminary distributor channels 210 are in turn each arranged perpendicularly, along the longitudinal axis L, of the shell 10 of the respective column 1, 3, 4, above an assigned final distributor channel 202 (cf. FIGS. 11, 12 and 13).

Figure 12:
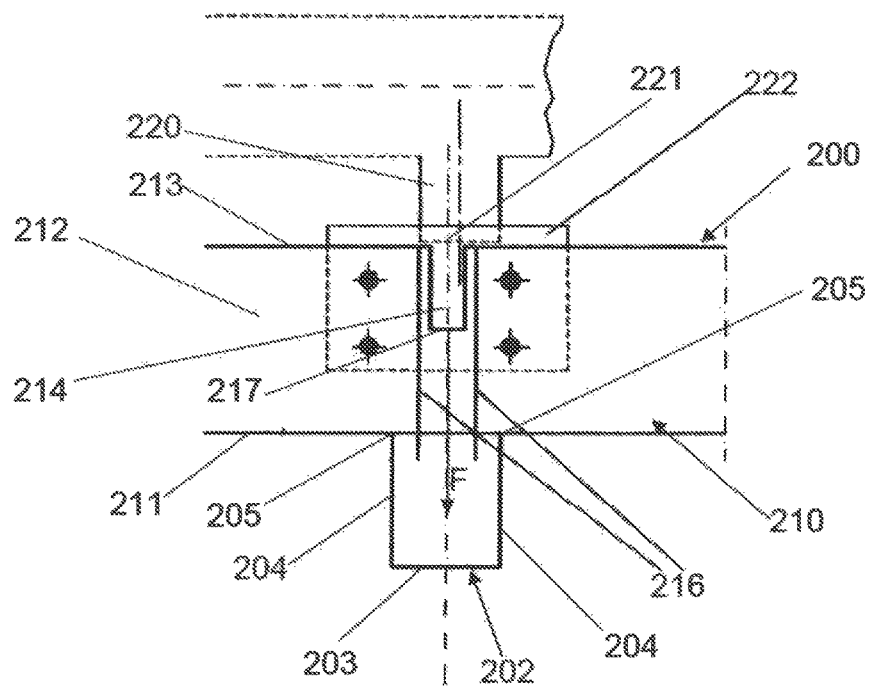
FIG. 12 shows a partially sectioned detail view of a feed pipe for a preliminary distributor channel of a liquid distributor as per FIGS. 8 to 11.
Figure 13:
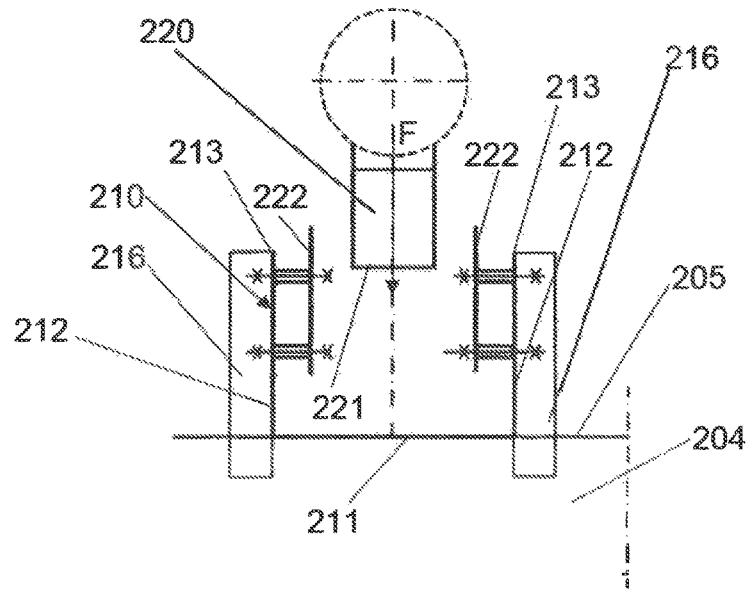
FIG. 13 shows a further partially sectioned detail view of a feed pipe for a preliminary distributor channel of a liquid distributor as per FIGS. 8 to 12.

In accordance with FIGS. 12 and 13, in turn, said preliminary distributor channels 210 are charged, via at least one feed pipe 220, preferably via two feed pipes 220, with the liquid phase F, said pipes 220 extending at least in sections along the longitudinal axis L of the shell 10 of the respective column 1, 3, 4; a cutout 221 of the respective feed pipe 220, via which the liquid phase F flows from the respective feed pipe 220 into the assigned preliminary distributor channel 210, faces the respective base 211 of the preliminary distributor channel 210 that is to be supplied, along said longitudinal axis L. Said feed pipes 220 are each arranged between two splash plates 222, which extend parallel to one another and which flank the cutout 221 of the respective feed pipe 220 on either side, and are each fixed in place on an assigned side wall 212 of the preliminary distributor channel 210 in question.

Furthermore, on the outwardly facing outsides of their side walls 212, at both sides of the cutouts 214 of the respective preliminary distributor channel 210, the preliminary distributor channels 210 have a baffle 216, these baffles 216 projecting vertically from the respective side wall 212 and each projecting, by a lower free end region, into the final distributor channel 202 arranged below the respective cutout 214. The baffles 216 serve to guide the flow of the liquid phase F from the cutouts 214 of the preliminary distributor channels 210 into the assigned final distributor channels 202.

In order that the liquid phase F in the two preliminary distributor channels 210 is always at the same level, the two preliminary distributor channels 210, in accordance with FIGS. 8 and 9, may be joined via at least one compensation channel 215, which is extended between the two preliminary distributor channels 210, specifically transversely with respect to them.

The liquid distributor 200 described above is used preferably for more viscous liquid phases F. Particularly in the case of more aqueous phases F, preference is given to using the second embodiment of the inventive liquid distributor 300, as described below.

This distributor 300, in accordance with FIGS. 16 to 21, has tubular final distributor channels 302 with a peripheral wall 303, in each of which there are cutouts 301 in the form of passage openings 301 for distributing the liquid phase F, with a plurality of such passage openings 301 being arranged alongside one another along a peripheral direction U of the respective final distributor channel 302 or of the respective wall 303. In accordance with FIG. 18, for example, two such passage openings 301 may be arranged alongside one another along the peripheral direction U, in such a way, for example, that the two openings 301 each point downwards at an angle of B=15° to B=50° (e.g. B=27°) to the vertical. Said angles are guided by the desired point of impingement of the jets on the runoff elements 101, and can be calculated in a known way (trajectory parabola with slanted trajectory). In accordance with FIG. 19, for example, four such passage openings 301 may be formed alongside one another on the wall 303 along the peripheral direction U, and the two outermost passage openings 301 may, for example, each point downwards at an angle of B=36° to the vertical, and the two inner passage openings 301, for example, at an angle of in each case B=12.5°.

Figure 16:
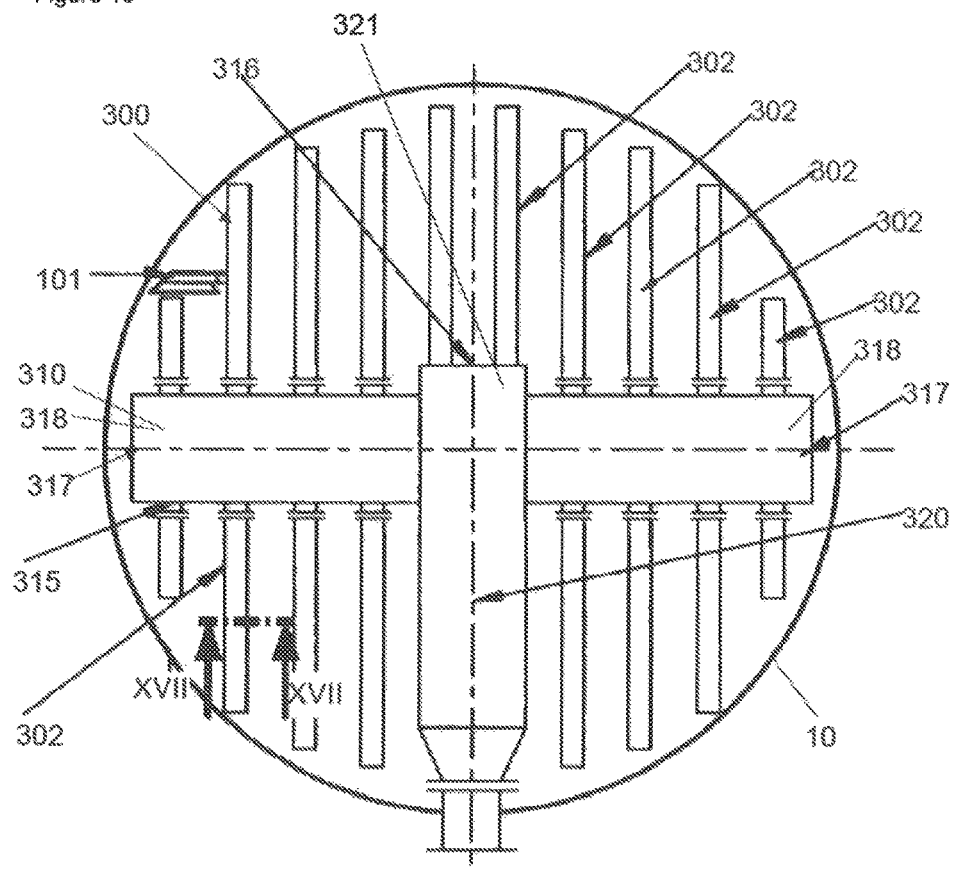
FIG. 16 shows a plan view of a further embodiment of a liquid distributor for the column as per FIGS. 14 and 15.
Figure 20:
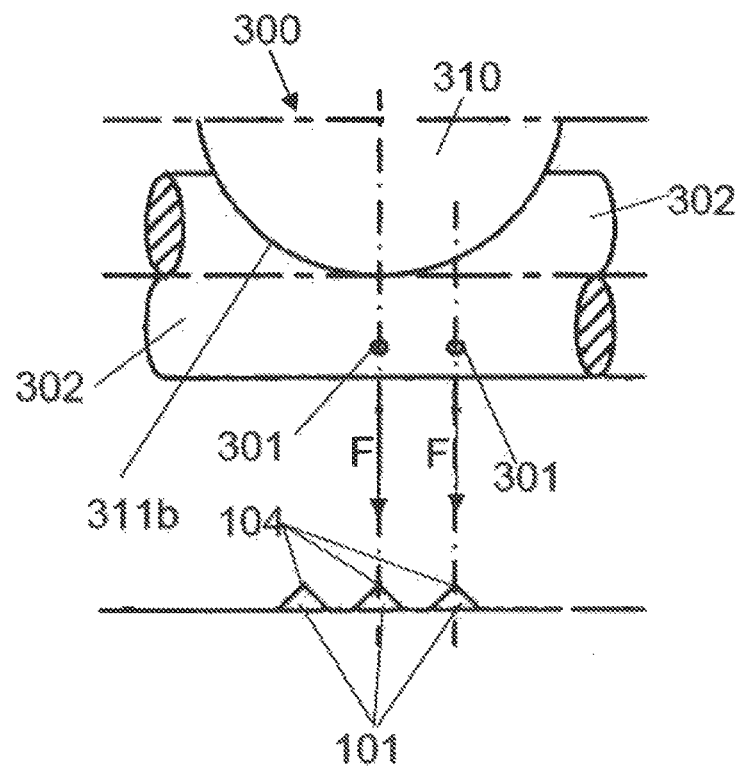
FIGS. 20-21 show detail views along the direction XX in FIG. 17.
Figure 21:
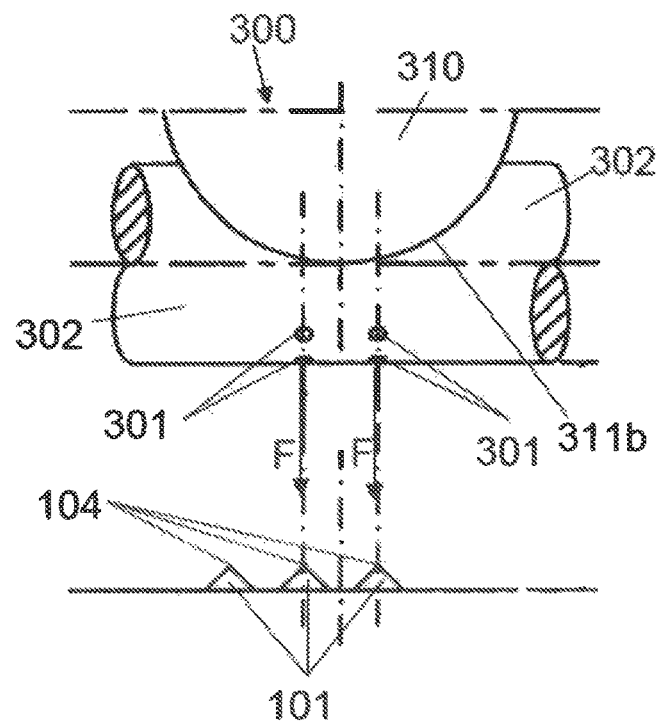

In accordance with FIG. 16, the tubular final distributor channels 302 each extend above the runoff elements 101 of the mass transfer trays 100 to be supplied, in parallel to the column cross section Q and also transversely to the runoff elements 101; the above-described cutouts 301 or passage openings 301, which are each formed one after another in the corresponding wall 303 along said peripheral direction U of a final distributor channel 302, are in turn each arranged perpendicularly along the longitudinal axis L above an edge 104 of an assigned runoff element 101, in order to feed that element 101 with the liquid phase F (cf. FIGS. 20 and 21).

Figure 17:
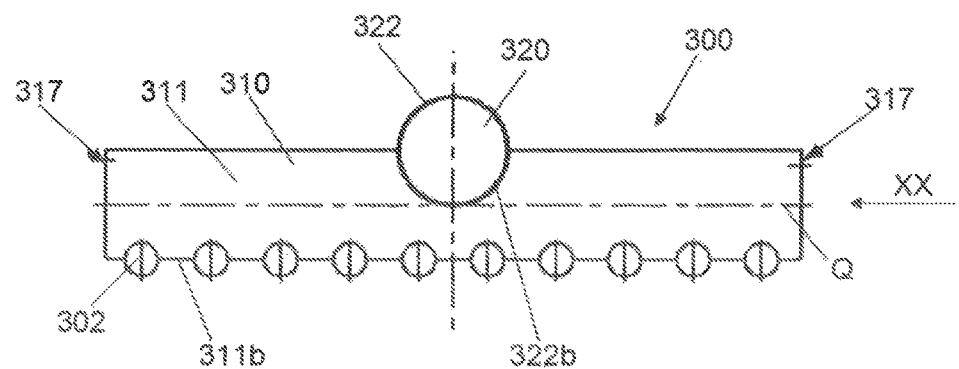
FIG. 17 shows a sectional view of the liquid distributor as per FIG. 16.
Figure 18:
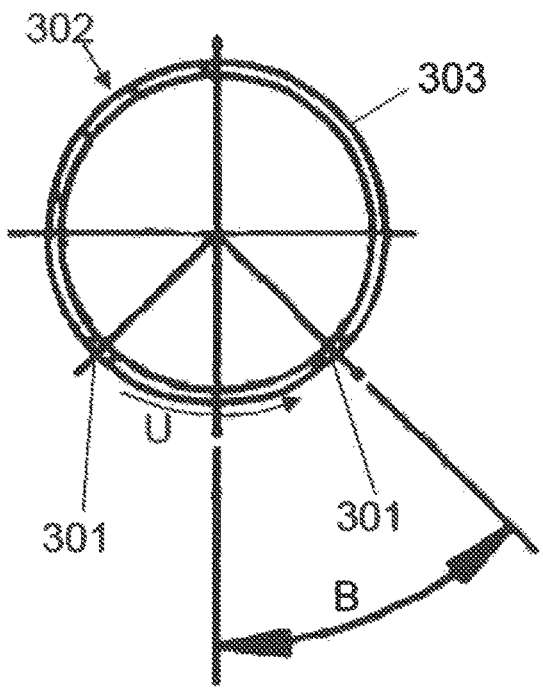
FIG. 18 shows a sectional view of a final distributor channel of a liquid distributor as per FIGS. 16 and 17.
Figure 19:
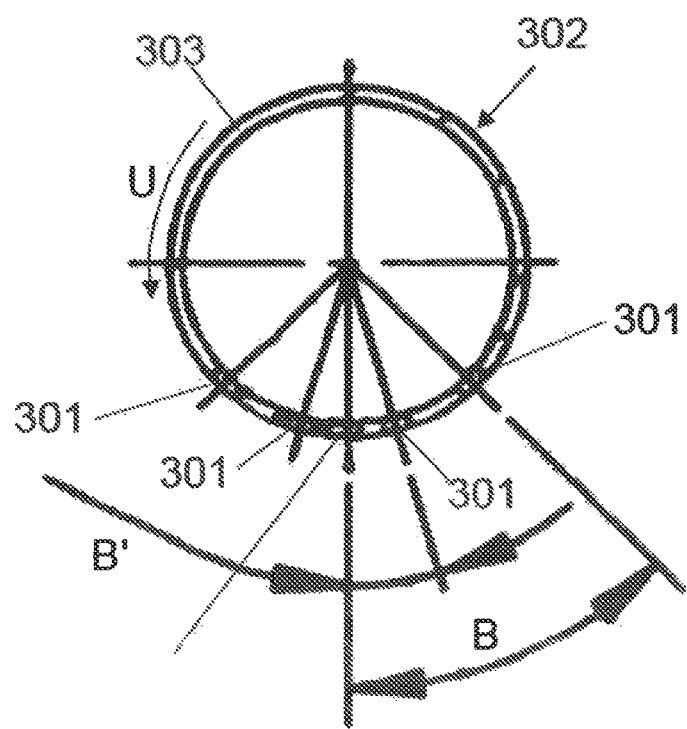
FIG. 19 shows a sectional view of a further final distributor channel.

In accordance with FIGS. 16 and 17, provision is further made for the final distributor channels 302 each to start from a tubular preliminary distributor channel 310, which extends transversely to the final distributor channels 302 and also parallel to the column cross section Q, with the preliminary distributor channel 310 having a peripheral wall 311 having a lower region 311b which faces downwards along the longitudinal axis L of the shell 10 (cf. also FIGS. 20 and 21); two final distributor channels 302 start from said region 311b in opposite directions and are flush with one another. Said tubular final distributor channels 302 are preferably each connected partably, preferably via a flange connection 315, to the preliminary distributor channel 310, and so can be taken off from the preliminary distributor channel 310 without destruction, for purposes, for example, of assembly and maintenance.

Furthermore, for the charging of the preliminary distributor channel 310 with the liquid phase F that is to be distributed, said preliminary distributor channel 310 is connected to an inflow pipe 320, which is extended parallel to the column cross section Q and also transversely and centrally with respect to the preliminary distributor channel 310. This preliminary distributor channel 310 starts from an end section 321 of the inflow pipe 320, specifically from a lower region 322*b*, facing downwards along said longitudinal axis L, of a peripheral wall 322 of the inflow pipe 320 (cf. FIG. 17).

For the venting of the inflow pipe 320, its end section 321 has a venting aperture 316 at a highest point. The preliminary distributor channel 310 as well, moreover, has a venting aperture 317 at a highest point of its two mutually opposite end sections 318.

FIG. 1 shows an inventive column 1 in the form of an oil scrub column, in which the above-described mass transfer tray 100 and also the liquid distributor 200 are employed, in the manner of FIGS. 8 to 13, this column 1 being provided—in the case, for example, of a liquid cracker for the cracking of naphtha for the production of olefins—as a first column after the steamcracker, in order to cool and to clean the cracking gas S produced in said steamcracker.

The column 1 has a substantially cylindrical shell 10, which is extended along a longitudinal axis L coincident with the vertical and which defines an interior of the column 1, which is subdivided into three process sections 20, 21 and 22, specifically an upper, first section 20, a middle, second section 21, situated beneath section 20, and a lower, third section 22, situated beneath section 21. The precooled cracking gas S is supplied, at a temperature between, for example, about 400° C. and 600° C., to the oil scrub column 1, in the base region of the lower, third section 22, via a gas distributor 420. The third section 22 of the oil scrub column 1 here has a plurality of mass transfer trays 100, which are arranged one above another along the longitudinal axis L; as described above, adjacent mass transfer trays 100 in each case are designed such that the runoff elements 101 of each lower mass transfer tray 100 are arranged centrally below the passage openings or holes in the mass transfer tray 100 arranged above it.

The cracking gas S flows through the entire interior of the column 1 from bottom to top along the longitudinal axis L of the shell 10 of the column 1; in the lower, third section 22, a liquid, hydrocarbon-containing phase F', namely a heavy oil F', is applied to the mass transfer trays 100 as described above as scrubbing medium F' by means of the liquid distributor 200, which is arranged along the longitudinal axis L above the mass transfer trays 100. The scrubbing medium F' flows down correspondingly in the third section 22 and is brought into intense contact with the ascending gas phase S by the mass transfer trays 100. As a result, the fraction of the heaviest hydrocarbons is separated out from this cracking gas phase S, and these hydrocarbons collect as heavy oil F' in the bottoms 12 of the column 1. From there, the heavy oil F' is drawn off, cooled and recycled as scrubbing medium F' at least partly into the third section 22 of the column 9, via the liquid distributor 200 therein, and is applied again to the gas phase S.

From the lowermost, third section 22, the gas phase S passes, via covered chimneys 411 of a chimney tray 410, into the middle, second section 21 of the column 1. Here, the gas phase S continues to rise upwards, likewise through mass transfer trays 100, which are fed in countercurrent, via a further liquid distributor 200 of the second section 21, with a liquid phase F in the form of a liquid, hydrocarbon-containing scrubbing medium F, and so corresponding components separated out from the gas phase S collect as light oil F on the chimney tray 410. From there, light oil F is able to pass directly via downcomers 412 into the preliminary distributor channels 210 of the liquid distributor 200 of the third section 22. Furthermore, said light oil F is drawn off from said chimney tray 410 from the second section 21 of the column 1, and is mixed with a petroleum spirit fraction, and is recycled as said scrubbing medium F, via said further liquid distributor 200, into the second section 21.

From the second section 21, the cracking gas S passes via the valve tray 403, lastly, into the upper, first section 20 of the column 1, where it passes via valve trays 401, 400 into the top 11 of the column 1, from where it is drawn off. In the first section 20, the gas phase S is contacted with a liquid, hydrocarbon-containing scrubbing medium F''', which represents a petroleum spirit fraction, for example, that comes from a decanter of a water/petroleum spirit separating facility in a downstream water scrubber, the scrubbing medium F''' being applied to the topmost valve tray 400 of the topmost section 20. By means of the scrubbing medium F''', in the upper, first section 20, a petroleum spirit fraction is separated out from the cracking gas S, and is able to pass via the downcomer 404 into the liquid distributor 200 of the second section 22 of the column 1, or can be added to the scrubbing medium F. If water F'''' is obtained as a second liquid, it may be drawn off from the first section 20 via a separate port.

For maintenance purposes, furthermore, the column 1 has a plurality of manholes 405, via which, in particular, the liquid distributors 200 are accessible.

FIGS. 14 and 15 show a further inventive column 2 in the form of a water quench column 2, which is more particularly a first column downstream of a steamcracker, serving for the cooling and cleaning of a cracking gas S which has been produced, in the case of the gas cracker, by steamcracking of a gaseous light feedstock, such as ethane, for example.

The cracking gas S here, in accordance with FIG. 14, is introduced via a gas distributor pipe 530 into a lower, third section 22 of the column 2, where it ascends through a plurality of mass transfer trays 100, arranged one above another, and in so doing is contacted with a liquid phase F, in the form of wafer, by means of a liquid distributor 300, in the manner of FIGS. 16 to 21. The liquid phase F is drawn off from the bottoms 12 of the column 2 and, after filtering if appropriate, is applied again via the liquid distributor 300 to the mass transfer trays 100 of the third section 22. The runoff elements 101 of these mass transfer trays 100 are arranged with an offset from one another, as described above.

From the third section 22, the gas phase S passes via covered chimneys 523 of a chimney tray 522 into a second section 21 of the column 2, this section 21 being provided above the third section 22 and being a section in which the gas phase S, as before in the third section 22, is passed through a plurality of said mass transfer trays 100, which are fed with a liquid phase F in the form of water via a further liquid distributor 300. The liquid phase F is drawn off from said chimney tray 522, and after filtering is recycled, via said liquid distributor 300 of the second section 22, to the second section 22.

From the second section 22, the gas phase S passes in turn via covered chimneys 521 of a chimney tray 520 into the upper, first section 20 of the column 2; above the chimney tray 520, there is a dumped bed 509, which rests on a support plate 508 and is bounded at the top by a bed limiter 506. Via a liquid distributor 504, the bed 509 is fed with a liquid phase F in the form of water, which collects on the chimney tray 520, from where it is drawn off and recycled to the liquid distributor 504. The bed 509 can also be fed by means of a scrubbing oil W via nozzles 507, in order to clean the bed if necessary. The ascending gas phase S passes via a separator 501 into the top 11 of the column 2, where it is drawn off. In addition, above said liquid distributor 504, via nozzles 502, a scrubbing oil W may be applied to the separator 501, in order to clean the separator if necessary.

For maintenance purposes, the water quench column 2 has a plurality of manholes 505, which allow access to internals of the column 2, such as the liquid distributors 300, 504, for example.

Furthermore, via corresponding ports T, A, the chimney trays 520, 522 can be skimmed off or freed from tar and other fouling products.

FIG. 22, lastly, shows further embodiments of inventive columns 3, 4, with column 3 being a column for the atmospheric distillation of a crude oil stream R, and column 4 being a column for vacuum distillation that distils the atmospheric residue.

In this case, a crude oil stream R is heated in a heating device 40 and is fed into a lower section 704 of the column 3 for atmospheric distillation as a two-phase mixture (under atmospheric column pressures). Via chimney trays 603, 602, 601, 600, the gaseous phase passes to the top 11 of the column 3, where it is drawn off 50 (e.g. containing ethane, propane and/or butane). In the individual sections 703, 702, 701, 700, via the respectively assigned trays 603, 602, 601, 600, the individual fractions of the crude oil R condense out and are drawn off as light distillates (e.g. petroleum spirit) 51 or middle distillates 52, 53, 54 (e.g. diesel fuels, heating oils) from the corresponding sections 703, 702, 701, 700 of the column 3. The respective condensate 54, 53, 52, 51 is cooled via a heat exchanger 5 and partly recycled to an upper region of the respective section 703, 702, 701, 700, where it is applied by means of a liquid distributor 200, in the manner of FIGS. 8 to 13, to the inventive mass transfer trays 100, which, as described above, may be arranged one above another and which produce an intense mass transfer between the ascending gas phase and the respective condensate 54, 53, 52, 51. Condensate 54 of the second section 703 may furthermore be introduced into the lowermost section 704, in which the atmospheric residue of the column 3 collects.

The bottoms product of the column 3, i.e. the atmospheric residue R' of the crude oil stream R, is again heated by means of a heating device 41 and introduced into the lowermost section 803 of the column 3 for vacuum distillation. In this case the gaseous phase of the atmospheric residue R' ascends through chimney trays 702, 701, 700 into the individual sections 802, 801, 800 of the column 4, more particularly under a column pressure in the range from 10 mbar to 30 mbar, and in the individual sections the corresponding condensates 63, 62, 61 are produced, these being heavy oils, in the bottoms of the column 4, as vacuum residue R'', tar and bitumen are obtained. The individual condensates 63, 62, 61 can be cooled by heat exchanger 6 and fed back partly into the column 4, where, in the respective section 802, 801, 800, by means of liquid distributors 200, in the manner of FIGS. 8 to 13, they are applied to the inventive mass transfer trays 100, arranged one above another, as described above.

LIST OF REFERENCE SYMBOLS

| | |
|---|---|
| 1 | Oil scrub column |
| 2 | Water quench column |
| 3 | Column for atmospheric distillation |
| 4 | Column for vacuum distillation |
| 5, 6 | Heat exchanger |
| 10 | Shell |
| 11 | Top |
| 12 | Bottoms |
| 20, 21, 22 | Sections of a column |
| 40, 41 | Heating devices |
| 50 | Gas phase |
| 51, 52, 53, 54 | Condensates |
| 61, 62, 63 | Condensates |
| 100 | Mass transfer tray |
| 101 | Runoff element |
| 101a, 101b | Segments |
| 101c | Cap |
| 101d | End region |
| 102, 103 | Arms |
| 102a, 103a | Runoff surfaces |
| 104 | Edge |
| 110 | Carrier ring |
| 111 | Bearing |
| 112 | Bearer |
| 112a | Surface |
| 113 | End region |
| 115 | Cover plate |
| 200 | Liquid distributer |
| 201 | Cutouts |
| 202 | Final distributor channel |
| 203 | Base |
| 204 | Side wall |
| 205 | Rim |
| 206 | Lower Edge |
| 210 | Preliminary distributor channel |
| 211 | Base |
| 212 | Side wall |
| 213 | Rim |
| 214 | Cutout |
| 215 | Compensation channel |
| 216 | Baffle |
| 217 | Lower edge |
| 220 | Feed pipe |
| 221 | Cutout |
| 222 | Splash plate |
| 300 | Liquid distributor |
| 301 | Cutout |
| 302 | Final distributor channel |
| 303 | Wall |
| 310 | Preliminary distributor channel |
| 311 | Wall |
| 311b | Lower region |
| 315 | Flange connection |
| 316, 317 | Venting aperture |
| 318, 321 | End section |
| 320 | Inflow pipe |
| 322 | Wall |
| 322b | Lower region |
| 400, 401, 402, 403 | Valve trays |
| 404 | Downcomer |
| 405 | Manhole |
| 501 | Separator |
| 501 | Nozzles |
| 504 | Liquid distributor |
| 505 | Manhole |
| 506 | Bed limiter |
| 507 | Nozzles |
| 508 | Support plate |
| 509 | Bed |
| 520 | Chimney tray |
| 521 | Chimney |
| 522 | Chimney tray |
| 523 | Chimney |
| 530 | Gas distributor plate |
| A, T | Ports |
| B, B' | Angles |
| F, F', F'' | Liquid phase and/or scrubbing media |

-continued

| | |
|---|---|
| F''' | Water |
| L | Longitudinal axis |
| Q | Column cross section |
| R | Crude oil stream |
| R' | Atmospheric residue |
| R" | Vacuum residue |
| S | Cracking gas |
| U | Peripheral direction |
| W | Scrubbing oil |

The invention claimed is:

1. A column having:
a shell extending along a longitudinal axis and enclosing an interior of the column,
at least one mass transfer tray extending along a cross section of the column which is transverse to the longitudinal axis of the column, and
at least one liquid distributor for feeding the at least one mass transfer tray with a liquid phase,
wherein said at least one mass transfer tray has a plurality of runoff elements extending parallel to and at a distance from one another, wherein each of said runoff elements extends along the column cross section, and each of said runoff elements has first and second runoff surfaces that extend along the cross section of the column, and said first and second runoff surfaces converging along the longitudinal axis in the direction of the liquid distributor to form an edge extending along the cross section of the column,
wherein said liquid distributor has a plurality of cutouts through which the liquid phase can be applied to the edges of the runoff elements, each of said cutouts being arranged perpendicularly above an edge of an assigned runoff element, whereby liquid phase applied to each runoff element flows off from the runoff element via the runoff surfaces at both sides of the edge of the runoff element, and
wherein said liquid distributor has a plurality of final distributor channels, each of said final distributor channels extending along said cross section of the column and also extending transversely to the runoff elements,
each of said final distributor channels
(a) having a base, which extends along the cross section of the column, and two side walls extending from said base, where each of said side walls has an upper rim, and where the cutouts are designed in the form of vacancies, at each of the upper rims of said side walls, or
(b) is in the shape of a tube having a peripheral wall, and where said cutouts are formed as passage openings in the peripheral walls.

2. The column according to claim 1, wherein said liquid distributor further comprises at least two preliminary distributor channels, parallel to one another, wherein said at least two preliminary distributor channels are arranged along the longitudinal axis above the final distributor channels, whereby said at least two preliminary distributor channels can feed the final distributor channels with the liquid phase.

3. The column according to claim 2, wherein said preliminary distributor channels each have a base extending along the cross section of the column, and two side walls extending from said base, said side walls each have an upper rim at which cutouts are provided, said cutouts permitting the liquid phase to flow from the primary channel into one of said final distributor channels.

4. The column according to claim 2, wherein said preliminary distributor channels communicate with one another via at least one compensation channel.

5. The column according to claim 1, wherein said column has at least one first section and at least one second section, wherein said at least one mass transfer tray and said at least one liquid distributor are arranged in said second section, and a mass transfer device is provided in said first section, and said mass transfer device in said first section is more transfer-effective than said at least one mass transfer tray in said second section.

6. The column according to claim 1, wherein said column is an oil scrub column having means to introduce a cracking gas and means to introduce a liquid hydrocarbon phase as the liquid phase so that the cracking gas and liquid hydrocarbon phase can flow in countercurrent.

7. The column according to claim 1, wherein said column is a water quench column having means to introduce a cracking gas and means to introduce a liquid comprising water as the liquid phase so that the cracking gas and the liquid phase can flow in countercurrent.

8. The column according to claim 1, wherein the runoff elements are shaped as equal-armed angular profiles, with two adjacent runoff elements in each case defining an elongated passage opening through which a gaseous phase is able to ascend in the column.

9. The column according to claim 1, wherein each of said final distributor channels has a base, which extends along the cross section of the column, and two side walls extending from said base, where each of said side walls has an upper rim, and where the cutouts are designed in the form of vacancies at each of the upper rims of said side walls.

10. The column according to claim 1, wherein each of said final distributor channels has is in the shape of a tube having a peripheral wall, and said cutouts are formed as passage openings in the peripheral walls.

11. The column according to claim 1, wherein cutouts are in the form of rectangular vacancies.

12. The column according to claim 2, wherein preliminary distributor channels extend transversely to the final distributor channels.

13. The column according to claim 3, wherein said cutouts provided at the upper rim of each side wall of the preliminary distributor channels are in the form of rectangular vacancies.

14. The column according to claim 3, wherein said cutouts provided at the upper rim of each side wall of the preliminary distributor channels are arranged in each case perpendicularly above an assigned final distributor channel.

15. The column according to claim 5, wherein said mass transfer device is a sieve tray, a valve tray, a mesh packing, a structured packing, or a dumped packing bed.

16. The column according to claim 1, wherein said column has a plurality of said mass transfer trays, said mass transfer trays being arranged one above another along the longitudinal axis of the column shell, and said mass transfer trays extending parallel to one another, wherein the runoff elements of two adjacent mass transfer trays are arranged offset relative to one another whereby a liquid phase which flows off from one runoff surface of an upper runoff element impinges on a runoff surface of a lower runoff element which is arranged beneath said upper runoff element.

17. The column according to claim 1, wherein said first and second runoff surfaces of each runoff element converge at said edge to form an angle in the range from 80° to 100°.

18. The column according to claim 1, wherein the width of each runoff surface, perpendicular to their direction of longitudinal extent, is 40 mm to 150 mm.

* * * * *